United States Patent
Lin et al.

(10) Patent No.: US 9,146,591 B2
(45) Date of Patent: Sep. 29, 2015

(54) CONNECTOR MODULE AND ELECTRONIC DEVICE USING THE SAME

(71) Applicant: Wistron Corporation, New Taipei (TW)

(72) Inventors: Huang-Chih Lin, New Taipei (TW); Chia-Lun Yeh, New Taipei (TW); Huai-Gang Liu, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 63 days.

(21) Appl. No.: 14/101,397

(22) Filed: Dec. 10, 2013

(65) Prior Publication Data
US 2014/0322939 A1    Oct. 30, 2014

(30) Foreign Application Priority Data
Apr. 25, 2013 (TW) .............................. 102207566 U

(51) Int. Cl.
| | |
|---|---|
| *H01R 13/447* | (2006.01) |
| *G06F 1/16* | (2006.01) |
| *H01R 13/44* | (2006.01) |
| *H01R 13/52* | (2006.01) |

(52) U.S. Cl.
CPC ............ *G06F 1/1656* (2013.01); *G06F 1/1658* (2013.01); *H01R 13/44* (2013.01); *H01R 13/447* (2013.01); *H01R 13/5213* (2013.01)

(58) Field of Classification Search
USPC ................................. 439/142, 135, 136, 137
See application file for complete search history.

(56) References Cited

U.S. PATENT DOCUMENTS

| | | | | |
|---|---|---|---|---|
| 5,574,625 | A  * | 11/1996 | Ohgami et al. | 361/679.09 |
| 6,887,087 | B2   | 5/2005  | Lai et al.    |            |
| 8,090,408 | B2 * | 1/2012  | Ochi et al.   | 455/558    |
| 8,199,464 | B2 * | 6/2012  | Zuo et al.    | 361/679.01 |
| 8,926,345 | B2 * | 1/2015  | Kim et al.    | 439/142    |
| 2005/0237398 | A1 * | 10/2005 | Fujii et al. | 348/231.99 |

FOREIGN PATENT DOCUMENTS

JP    2006-119881    * 10/2006

* cited by examiner

*Primary Examiner* — Abdullah Riyami
*Assistant Examiner* — Harshad Patel
(74) *Attorney, Agent, or Firm* — McClure, Qualey & Rodak, LLP

(57) ABSTRACT

A connector module and an electronic device using the same are provided. The connector module is disposed on a main body of an electronic device, and comprises a connector and a door structure. The connector has a slot used for accommodating the electronic card. The door structure comprises a door, a push rod and a connection rod. The door is used for covering the slot. The push rod is connected to the door and used for pressing the electronic card. The connection rod is disposed on the door and movably connected to the connector. When the door structure covers the slot, the push rod enters the slot and staggers with the electronic card.

17 Claims, 4 Drawing Sheets

CONNECTOR MODULE AND ELECTRONIC DEVICE USING THE SAME

This application claims the benefit of Taiwan application Serial No. 102207566, filed Apr. 25, 2013, the subject matter of which is incorporated herein by reference.

BACKGROUND OF THE INVENTION

1. Field of the Invention

The invention relates in general to a connector module and an electronic device using the same, and more particularly to a connector module used for pressing an electronic card and an electronic device using the same.

2. Description of the Related Art

To augment the function, portable electronic devices are normally equipped with a connector for accommodating an electronic card, such as a memory card. However, along with the development of portable electronic devices, the casing of portable electronic devices is getting thinner and thinner, and the overall thickness of most portable electronic products is smaller than the width of a finger, making the loading and unloading of electronic card become more difficult.

SUMMARY OF THE INVENTION

The invention is directed to a connector module and an electronic device using the same. The connector module is used for pressing and unloading an electronic card, so that the electronic card can be easily unloaded.

According to one embodiment of the present invention, a connector module is provided. The connector module is disposed on a main body of an electronic device and comprises a connector and a door structure. The connector has a slot used for accommodating an electronic card. The door structure comprises a door, a push rod and a connection rod. The door is used for covering the slot. The push rod is connected to the door and used for pressing the electronic card. The connection rod is disposed on the door and movably connected to the connector. When the door structure covers the slot, the push rod enters the slot and staggers with the electronic card.

According to another embodiment of the present invention, an electronic device is provided. The electronic device comprises a main body and a connector module. The connector module is disposed on a main body of an electronic device and comprises a connector and a door structure. The connector has a slot used for accommodating an electronic card. The door structure comprises a door, a push rod and a connection rod. The door is used for covering the slot. The push rod is connected to the door and used for pressing the electronic card. The connection rod is disposed on the door and movably connected to the connector. When the door structure covers the slot, the push rod enters the slot and staggers with the electronic card.

According to an alternate embodiment of the present invention, an electronic device is provided. The electronic device comprises a main body and a connector module. The main body comprises a casing. The connector module is disposed on the main body, and comprises a connector and a door structure. The connector has a slot used for accommodating an electronic card. The door structure comprises a door, a push rod and a connection rod. The door is used for covering the slot. The push rod is connected to the door and used for pressing the electronic card. The connection rod is disposed on the door and movably connected to casing. When the door structure covers the slot, the push rod enters the slot and staggers with the electronic card.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
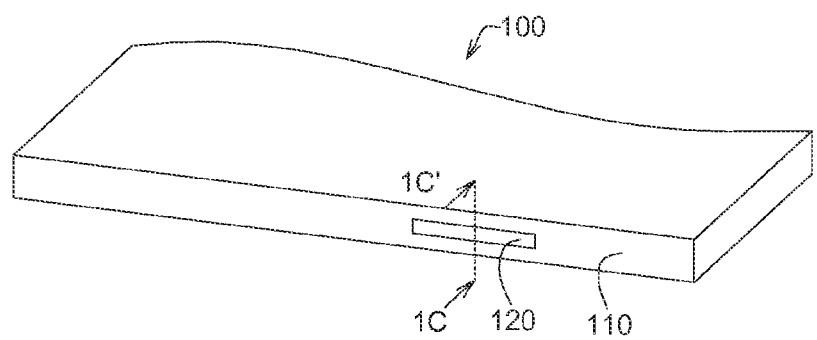
FIG. 1A is an appearance diagram of an electronic device according to an embodiment of the present invention.

Referring to FIG. 1A, an appearance diagram of an electronic device according to an embodiment of the present invention is shown. The electronic device 100 is such as a notebook computer, a mobile phone, a tablet PC or other types of electronic devices. The electronic device 100 comprises a main body 110 and a connector module 120. The connector module 120 is disposed inside the main body 110 and electrically connected to a circuit board (not illustrated) inside the main body 110, such that the electronic card 130 (FIG. 1B) disposed inside the connector module 120 can be electrically connected to the circuit board via the connector module 120.

Figure 1B:
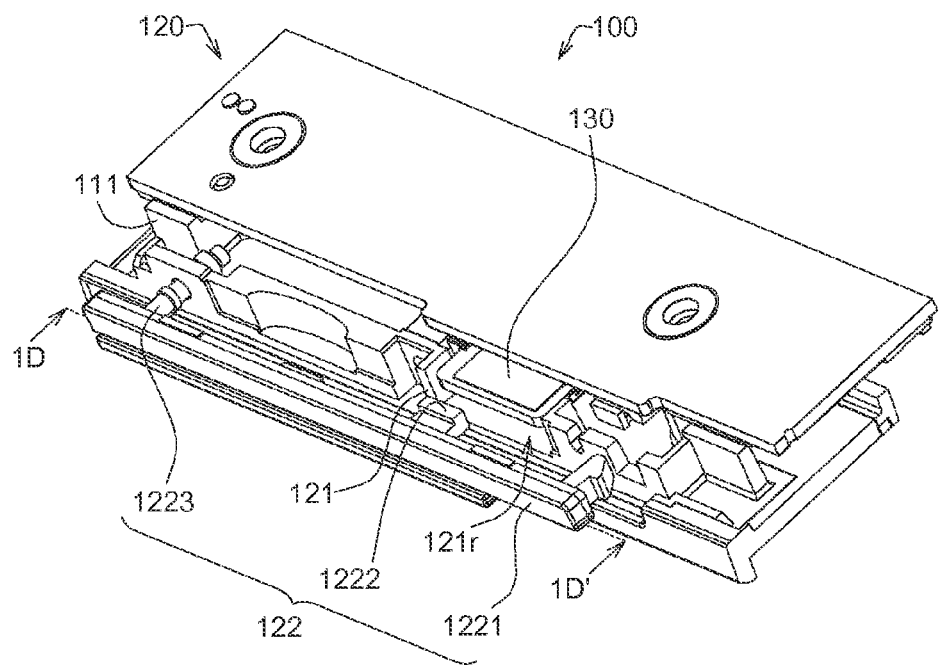
FIG. 1B is an appearance diagram of a connector module of FIG. 1A.

Referring to FIG. 1B, an appearance diagram of a connector module of FIG. 1A is shown. The connector module 120 comprises a connector 121 and a door structure 122. The connector 121 has a slot 121r used for accommodating the electronic card 130. The electronic card 130 is such as a memory card, communication related electronic card or other types of electronic cards. The door structure 122 comprises a door 1221 and a push rod 1222. The push rod 1222 is disposed on an inner wall of the door 1221. After the door 1221 is opened and the electronic card 130 is exposed, the push rod 1222 can be used to press the electronic card 130 for ejecting the electronic card 130 outwards or unloading the card such that the electronic card 130 can be smoothly unloaded. Although it may be difficult or inconvenient for a user to directly press and unload the electronic card 130 with a finger, the user still can make the electronic card 130 ejected and unloaded by operating the door 1221 to drive the push rod 1222 to press or unload the electronic card 130. Besides, the push rod 1222 is hard, and is unbendable or difficult to bend. In comparison to soft push rod, the present invention adopts the hard push rod 1222 which can firmly press the electronic card 130 such that the electronic card 130 can be ejected or unloaded.

Figure 1C:
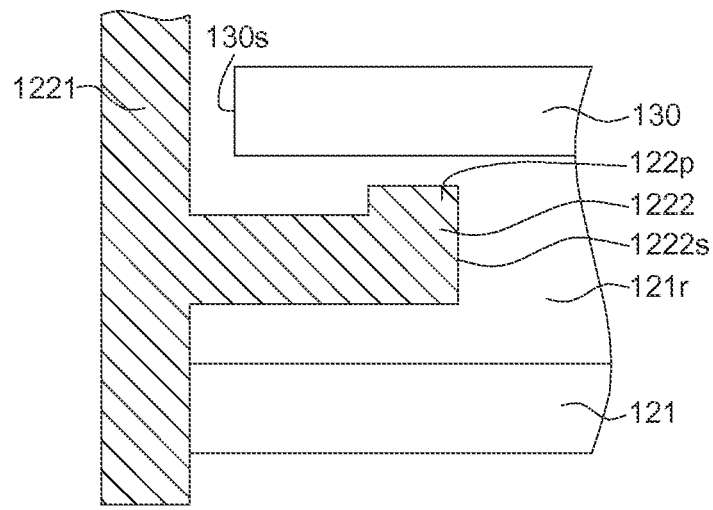
FIG. 1C is a partial cross-sectional view along direction 1C-1C' of FIG. 1A.

Referring to FIG. 1C, a partial cross-sectional view along direction 1C-1C' of FIG. 1A is shown. When the door 1221 covers the slot 121r, the push rod 1222 is accommodated in the slot 121r, and staggers with the electronic card 130 in a top down manner such that the push rod 1222 is not interfered with by the electronic card 130. The push rod 1222 has a protrusion 122p extended towards the electronic card 130. The protrusion 122p can increase the area of the terminal surface 1222s of the push rod 1222, so that the push rod 1222 can press the terminal surface 130s of the electronic card 130 by a larger area, and the terminal surface 1222s of the push rod 1222 can be easily pressed. Besides, the protrusion 122p of the push rod 1222 form a hook by which the push rod 1222 can be engaged with the electronic card 130, and the electronic card 130 can thus be easily unloaded.

In the present example, the push rod 1222 is located under the electronic card 130. In another example, the push rod 1222 is located above the electronic card 130. In addition, the terminal surface 1222s of the push rod 1222 is a flat terminal surface, but the present invention embodiment is not limited thereto (elaborated below).

Figure 1D:
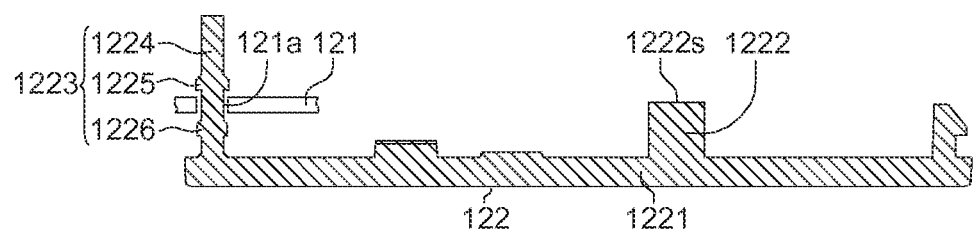
FIG. 1D is a partial cross-sectional view along direction 1D-1D' of FIG. 1B.

Referring to FIG. 1D, a partial cross-sectional view along direction 1D-1D' of FIG. 1B is shown. The door structure 122 further comprises a connection rod 1223 disposed on the door 1221. The connection rod 1223 is movably connected to the connector 121 as well as the casing 111 of the main body 110 (FIG. 1B). In an example, the connector 121 is a portion of the casing 111. Under such design, the door structure 122 can be separately manufactured and then is connected to the casing 111 (the connector 121). In another example, the connector 121 and the casing 111 are two separate elements. Under such design, the connector 121 and the door structure 122 can be integrated into a connector module 120 and then is connected to casing 111. To put it in greater details, the connection rod 1223 comprises a cylindrical rod 1224, a position-limited flange 1225 and an engaging flange 1226. The position-limited flange 1225 and the engaging flange 1226 are disposed on cylindrical rod 1224. The connector 121 has an engaging hole 121a. The outer diameter of the cylindrical rod 1224 is smaller than the inner diameter of the engaging hole 121a so that the cylindrical rod 1224 can be movably connected to the connector 121. The position-limited flange 1225 is located inside the connector 121. The outer diameter of the position-limited flange 1225 is larger than the inner diameter of the engaging hole 121a, so that the connection rod 1223 can hardly be separated from the connector 121. The outer diameter of the engaging flange 1226 is substantially equal to or larger than the inner diameter of the engaging hole 121a. When the door structure 122 covers the slot 121r (illustrated in FIG. 1B), the engaging flange 1226 can be engaged inside the engaging hole 121a to avoid the door 1221 being easily separated from the connector 121.

Besides, the connection rod 1223 is such as a flexible connection rod. Thus, when the door 1221 is separated from the connector 121, the door 1221 has a larger degree of freedom and larger range of movement, and the push rod 1222 can be more flexibly pressed to unload the electronic card 130 (illustrated in FIG. 1B).

Figure 2:
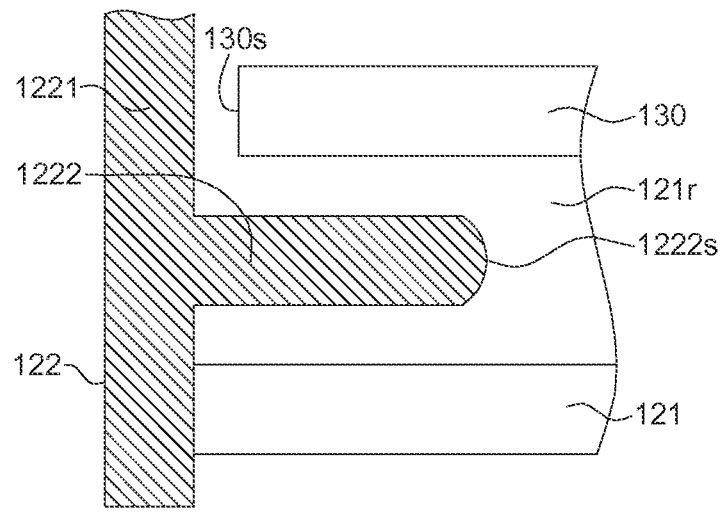
FIG. 2 is a cross-sectional view of a connector module according to another embodiment of the present invention.

Referring to FIG. 2, a cross-sectional view of a connector module according to another embodiment of the present invention is shown. In the present example, the terminal surface 1222s of the push rod 1222 of the door structure 122 is an arced terminal surface. When the door 1221 is separated from the connector 121, the push rod 1222 presses the terminal portion 130s of the electronic card 130 by the arced terminal surface, such that the electronic card 130 can be ejected.

Figure 3:
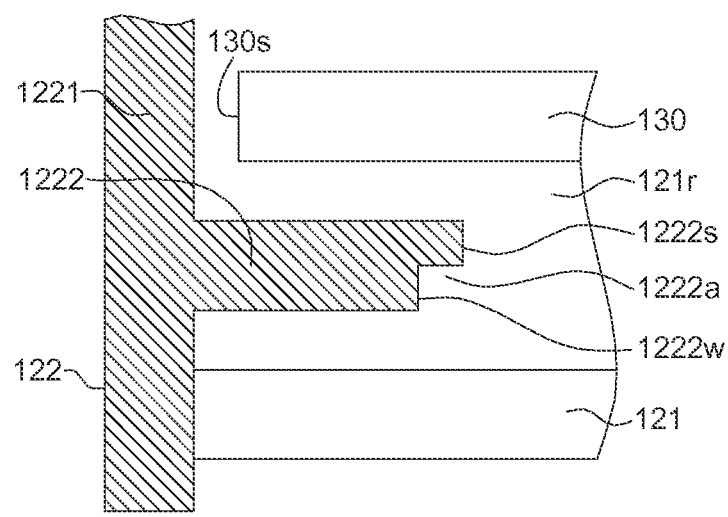
FIG. 3 is a cross-sectional view of a connector module according to another embodiment of the present invention.

Referring to FIG. 3, a cross-sectional view of a connector module according to another embodiment of the present invention is shown. In the present example, the push rod 1222 of the door structure 122 has a stepped terminal portion. In greater details, the push rod 1222 has a recess 1222a extended towards the door 1221 by a distance from the terminal surface 1222s of the push rod 1222 to form a sidewall 1222w. When the door 1221 is separated from the connector 121, the push rod 1222 presses the terminal portion 130s of the electronic card 130 by the sidewall 1222w, such that the electronic card 130 can be ejected.

In the above embodiment, the cylindrical rod 1224 is extended along a continuous straight line to from a continuous cylinder (FIG. 1D), but the present invention is not limited thereto.

Figure 4A:
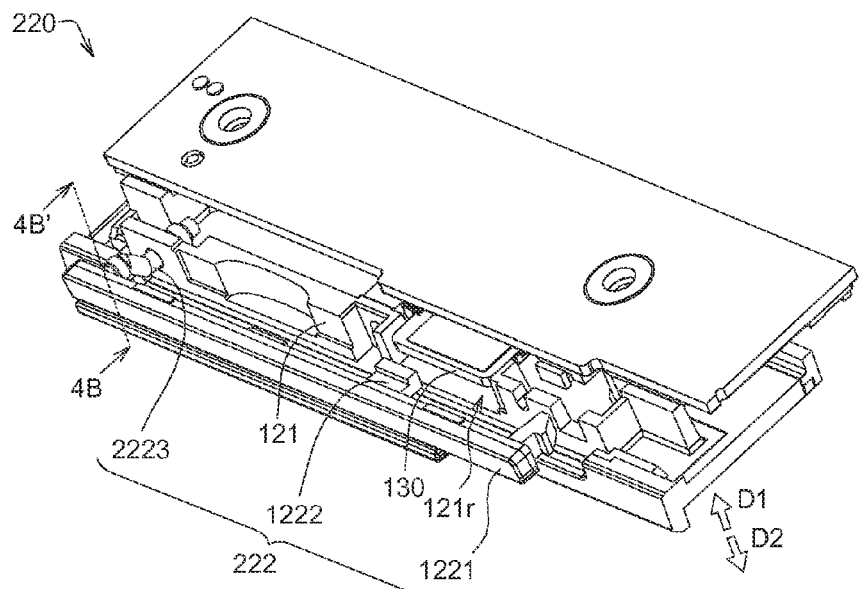
FIG. 4A is an appearance diagram of a connector module according to of the present invention another embodiment.

Referring to FIG. 4A, an appearance diagram of a connector module according to of the present invention another embodiment is shown. The connector module 220 comprises a connector 121 and a door structure 222. The door structure 222 comprises a door 1221, a push rod 1222 and a connection rod 2223. The connection rod 2223 is disposed on the door 1221 and movably connected to the connector 121.

Figure 4B:
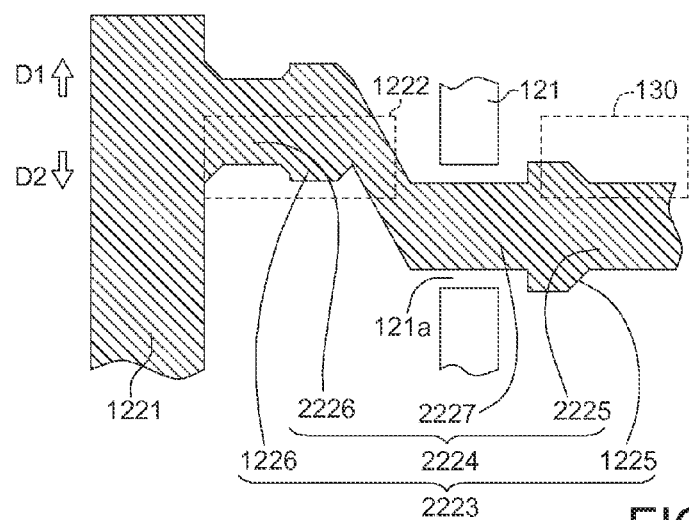
FIG. 4B is a cross-sectional view along direction 4B-4B' of FIG. 4A.

Referring to FIG. 4B, a cross-sectional view along direction 4B-4B' of FIG. 4A is shown. The connection rod 2223 comprises a cylindrical rod 2224, a position-limited flange 1225 and an engaging flange 1226. The position-limited flange 1225 and the engaging flange 1226 are disposed on cylindrical rod 2224. In the present example, the cylindrical rod 2224 is a snake-shaped rod. To put it in greater details, the cylindrical rod 2224 comprises a first cylindrical rod 2225, a second cylindrical rod 2226 and a connection cylindrical rod 2227. The first cylindrical rod 2225 and the second cylindrical rod 2226 are extended along a straight line. The connection cylindrical rod 2227 connects the first cylindrical rod 2225 and the second cylindrical rod 2226 at an included angle different from 180 degrees to form a snake-shaped tube. That is, both the included angle between the connection cylindrical rod 2227 and the first cylindrical rod 2225 and the included angle between the connection cylindrical rod 2227 and the second cylindrical rod 2226 are different from 180 degrees.

As indicated in FIG. 4B, through the snake-shaped tube structure of the connection rod 2223, after the door 1221 is driven upwards (along direction D1) and moved away from the slot 121r (FIG. 4A) so as to be separated from the connector 121, the push rod 1222 (illustrated in dotted lines) is driven upwards to a position basically aligned with the electronic card 130 (illustrated in dotted lines), the user can operate the door 1221 to drive the push rod 1222 to press the electronic card 130 for ejecting the electronic card 130. Moreover, through the snake-shaped tube structure of the connection rod 2223, after the door 1221 is driven downwards (along direction D2) and moved towards the slot 121r (FIG. 4A) to cover the slot 121r, the push rod 1222 enters the slot 121r to be located under the electronic card 130 and staggers with the electronic card 130 in a top down manner, hence avoiding the push rod 1222 interfering with the electronic card 130.

Although the connection rod 2223 of the above embodiment is exemplified by the snake-shaped tube structure of FIG. 4B, the present invention is not limited thereto. The connection rod 2223 can be bent along any curve, and the connection rod 2223 of the present invention can be realized by any bent rod capable of moving inside the engaging hole 121a.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A connector module disposed on a main body of an electronic device, comprising:
   a connector having a slot used for accommodating an electronic card; and
   a door structure, comprising:
   a door used for covering the slot;
   a push rod connected to the door and used for pressing the electronic card; and
   a connection rod disposed on the door and movably connected to the connector;
   wherein, when the door structure covers the slot, the push rod enters the slot and staggers with the electronic card, wherein the connector has an engaging hole, and the connection rod comprises: a cylindrical rod; a position-limited flange disposed on the cylindrical rod and located inside the connector, wherein an outer diameter of the position-limited flange is larger than an inner diameter of the engaging hole; and an engaging flange disposed on the cylindrical rod and located outside the connector, wherein an outer diameter of the engaging flange is substantially equal to or larger than the inner diameter of the engaging hole, such that when the door structure covers the slot, the engaging flange is engaged inside the engaging hole.

2. The connector module according to claim 1, wherein the push rod has a stepped terminal portion.

3. The connector module according to claim 1, wherein the push rod has a recess extended towards the door by a distance from a terminal surface of the push rod to form a sidewall, and the push rod presses a terminal portion of the electronic card by the sidewall.

4. The connector module according to claim 1, wherein the terminal surface of the push rod is a flat terminal surface or an arced terminal surface.

5. The connector module according to claim 1, wherein the connection rod is a flexible connection rod.

6. The connector module according to claim 1, wherein the cylindrical rod is a snake-shaped rod.

7. The connector module according to claim 1, wherein the cylindrical rod comprises:
   a first cylindrical rod, wherein the first cylindrical rod is straight extended;
   a second cylindrical rod, wherein the second cylindrical rod is straight extended; and
   a connection cylindrical rod connecting the first cylindrical rod and the second cylindrical rod, wherein an included angle between the connection cylindrical rod and the first cylindrical rod is different from 180 degrees, and an included angle between the connection cylindrical rod and the second cylindrical rod is different from 180 degrees.

8. An electronic device, comprising:
   a main body; and
   a connector module disposed on the main body and comprising:
   a connector having a slot used for accommodating an electronic card; and
   a door structure, comprising:
   a door used for covering the slot;
   a push rod connected to the door and used for pressing the electronic card; and
   a connection rod disposed on the door and movably connected to the connector;
   wherein, when the door structure covers the slot, the push rod enters the slot and staggers with the electronic card, wherein the connector has an engaging hole, and the connection rod comprises: a cylindrical rod; a position-limited flange disposed on the cylindrical rod and located inside the connector, wherein an outer diameter of the position-limited flange is larger than the inner diameter of the engaging hole; and an engaging flange disposed on the cylindrical rod and located outside the connector, wherein an outer diameter of the engaging flange is substantially equal to or larger than the inner diameter of the engaging hole, such that when the door structure covers the slot, the engaging flange is engaged inside the engaging hole.

9. The electronic device according to claim 8, wherein the push rod has a stepped terminal portion.

10. The electronic device according to claim 8, wherein the push rod has a recess extended towards the door by a distance from a terminal surface of the push rod to form a sidewall, and the push rod presses a terminal portion of the electronic card by the sidewall.

11. The electronic device according to claim 8, wherein the terminal surface of the push rod is a flat terminal surface or an arced terminal surface.

12. The electronic device according to claim 8, wherein the connection rod is a flexible connection rod.

13. The electronic device according to claim 8, wherein the cylindrical rod is a snake-shaped rod.

14. The electronic device according to claim 8, wherein the cylindrical rod comprises:
   a first cylindrical rod, wherein the first cylindrical rod is straight extended;
   a second cylindrical rod, wherein the second cylindrical rod is straight extended; and
   a connection cylindrical rod connecting the first cylindrical rod and the second cylindrical rod, wherein an included angle between the connection cylindrical rod and the first cylindrical rod is different from 180 degrees, and an included angle between the connection cylindrical rod and the second cylindrical rod is different from 180 degrees.

15. The electronic device according to claim 8, wherein the main body comprises a casing, and the connector is a portion of the casing.

16. An electronic device, comprising:
   a main body, comprising a casing; and
   a connector module disposed on the main body and comprising:
   a connector having a slot used for accommodating an electronic card; and
   a door structure, comprising:
   a door used for covering the slot;
   a push rod connected to the door and used for pressing the electronic card; and
   a connection rod disposed on the door and movably connected to the casing;
   wherein, when the door structure covers the slot, the push rod enters the slot and staggers with the electronic card, wherein the connector has an engaging hole, and the connection rod comprises: a cylindrical rod; a position-limited flange disposed on the cylindrical rod and located inside the connector, wherein an outer diameter of the position-limited flange is larger than the inner diameter of the engaging hole; and an engaging flange disposed on the cylindrical rod and located outside the connector, wherein an outer diameter of the engaging flange is substantially equal to or larger than the inner diameter of the engaging hole, such that when the door structure covers the slot, the engaging flange is engaged inside the engaging hole.

17. The electronic device according to claim 16, wherein the connector is a portion of the casing.

* * * * *